US012436264B2

(12) United States Patent
Janssens et al.

(10) Patent No.: US 12,436,264 B2
(45) Date of Patent: Oct. 7, 2025

(54) METHOD, SYSTEM AND COMPUTER PROGRAM PRODUCT FOR BLIND SPOT DETECTION

(71) Applicant: ROMBIT NV, Antwerp (BE)

(72) Inventors: Nico Janssens, Putte (BE); Brett Daman, Muizen (BE)

(73) Assignee: ROMBIT NV, Antwerp (BE)

( * ) Notice: Subject to any disclaimer, the term of this patent is extended or adjusted under 35 U.S.C. 154(b) by 441 days.

(21) Appl. No.: 17/996,415

(22) PCT Filed: Apr. 20, 2021

(86) PCT No.: PCT/IB2021/053237
§ 371 (c)(1),
(2) Date: Oct. 17, 2022

(87) PCT Pub. No.: WO2021/214647
PCT Pub. Date: Oct. 28, 2021

(65) Prior Publication Data
US 2023/0194695 A1    Jun. 22, 2023

(30) Foreign Application Priority Data
Apr. 20, 2020    (BE) .................................. 2020/5259

(51) Int. Cl.
*G01S 13/76*    (2006.01)
*G01S 3/50*    (2006.01)
*H04W 4/021*    (2018.01)

(52) U.S. Cl.
CPC ................ *G01S 13/76* (2013.01); *G01S 3/50* (2013.01); *H04W 4/022* (2013.01)

(58) Field of Classification Search
CPC . G01S 5/14; G01S 5/06; G01S 13/878; G01S 13/931; G01S 2013/9315
(Continued)

(56) References Cited

U.S. PATENT DOCUMENTS 7,363,125 B2 * 4/2008 Hashimoto ............. G01S 15/74
73/861.27
7,889,116 B2 * 2/2011 Harada .................. G01S 13/931
342/70
(Continued)

FOREIGN PATENT DOCUMENTS

CN    107415823 A  * 12/2017  ............ B60W 50/14
WO    2021/214647 A1    10/2021

OTHER PUBLICATIONS

ISR-WO dated Aug. 16, 2021 for parent application PCT/IB2021/053237.
(Continued)

*Primary Examiner* — Michael W Justice
(74) *Attorney, Agent, or Firm* — Vorys, Sater, Seymour and Pease LLP

(57) ABSTRACT

The invention relates to a method, system and computer program product for determining a position of a person with respect to a blind spot of a vehicle. In a first aspect, the invention relates to a method for determining a position of a person with respect to a blind spot of a vehicle. In a second and third aspect, the invention relates to a system and a computer program product, respectively, for determining a position of a person with respect to a blind spot of a vehicle. Embodiments of the present invention are discussed throughout the claims, description and figures.

16 Claims, 4 Drawing Sheets

(58) Field of Classification Search
USPC .................................................. 342/70, 27
See application file for complete search history.

(56) References Cited

U.S. PATENT DOCUMENTS

| | | | | |
|---|---|---|---|---|
| 8,493,195 | B2* | 7/2013 | Lee | B60Q 9/008 |
| | | | | 340/435 |
| 9,409,518 | B2* | 8/2016 | Sala | B60R 1/025 |
| 9,688,272 | B2* | 6/2017 | Shiraishi | B60W 30/14 |
| 10,024,960 | B2* | 7/2018 | Brandt | G06V 20/56 |
| 10,106,154 | B2* | 10/2018 | Nguyen Van | B60W 30/08 |
| 10,497,265 | B2* | 12/2019 | Ohnishi | G06V 20/54 |
| 10,696,297 | B2* | 6/2020 | Nguyen Van | B60W 30/095 |
| 10,744,926 | B2* | 8/2020 | Iwai | G01S 13/931 |
| 10,821,901 | B2* | 11/2020 | DuBridge | B60Q 1/2665 |
| 10,901,078 | B2* | 1/2021 | Aoyagi | B60W 30/08 |
| 10,928,511 | B2* | 2/2021 | Nasser | G01S 13/931 |
| 11,016,190 | B2* | 5/2021 | Koskan | G01S 13/42 |
| 11,021,172 | B2* | 6/2021 | Kim | B60W 50/14 |
| 11,332,135 | B2* | 5/2022 | Manocha | B60W 60/007 |
| 11,391,820 | B2* | 7/2022 | Chen | G05D 1/0257 |
| 12,148,303 | B2* | 11/2024 | Yoshitake | G08G 1/167 |
| 2005/0012604 | A1* | 1/2005 | Takahashi | G08G 1/166 |
| | | | | 340/435 |
| 2006/0259213 | A1* | 11/2006 | Hashimoto | G01S 15/74 |
| | | | | 701/23 |
| 2009/0040094 | A1* | 2/2009 | Harada | G01S 13/931 |
| | | | | 342/59 |
| 2010/0117813 | A1* | 5/2010 | Lee | B60W 40/04 |
| | | | | 340/435 |
| 2013/0155534 | A1* | 6/2013 | Sala | B60R 1/072 |
| | | | | 359/843 |
| 2015/0145711 | A1* | 5/2015 | Maddox | G01S 13/931 |
| | | | | 342/27 |
| 2015/0145713 | A1* | 5/2015 | Maddox | G01S 13/931 |
| | | | | 342/47 |
| 2015/0353078 | A1* | 12/2015 | Kaminade | B60W 30/0956 |
| | | | | 701/1 |
| 2017/0101092 | A1* | 4/2017 | Nguyen Van | G01S 13/931 |
| 2017/0115378 | A1* | 4/2017 | Haghighi | G01S 7/4052 |
| 2017/0307732 | A1* | 10/2017 | Haghighi | G01S 7/4056 |
| 2017/0341576 | A1* | 11/2017 | Lei | G08G 1/163 |
| 2018/0259636 | A1* | 9/2018 | Aoyagi | G08G 1/166 |
| 2018/0336787 | A1* | 11/2018 | Ohnishi | G08G 1/167 |
| 2019/0001971 | A1* | 1/2019 | Nguyen Van | B60W 10/04 |
| 2019/0033439 | A1* | 1/2019 | Gu | G01S 7/415 |
| 2019/0179010 | A1* | 6/2019 | Nasser | B60D 1/62 |
| 2019/0291646 | A1* | 9/2019 | DuBridge | B60K 35/29 |
| 2020/0062277 | A1* | 2/2020 | Kim | G01S 13/867 |
| 2020/0101889 | A1* | 4/2020 | Iwai | G01S 13/931 |
| 2020/0166636 | A1* | 5/2020 | Mihajlovic | G05D 1/0257 |
| 2020/0282982 | A1* | 9/2020 | Nguyen Van | B60W 30/0956 |
| 2020/0319333 | A1* | 10/2020 | Koskan | B60Q 9/00 |
| 2020/0341118 | A1* | 10/2020 | Chen | G05D 1/0088 |
| 2021/0350706 | A1* | 11/2021 | Yoshitake | G06T 7/521 |

OTHER PUBLICATIONS

Stefan Galler et al, "Combined AOA/TOA UWB localization", Communications and Information Technologies, 2007. ISCIT '07. Int Ernational Symposium on, IEEE, PI,Oct. 1, 2007 (Oct. 1, 2007), p. 1049-1053, XP031166616, ISBN: 9781424409761.

Rohrig C et al, "Tracking of transport vehicles for warehouse management using a wireless sensor network", Intelligent Robots and Systems, 2008. IROS 2008. IEEE/RSJ International Conference on, IEEE, Piscataway, NJ, USA,Sep. 22, 2008 (Sep. 22, 2008), p. 3260-3265, XP032335316.

* cited by examiner

METHOD, SYSTEM AND COMPUTER PROGRAM PRODUCT FOR BLIND SPOT DETECTION

TECHNICAL FIELD

The invention relates to a method, system and computer program product for determining a position of a person with respect to a blind spot of a vehicle.

PRIOR ART

Collisions between people and vehicles represent a significant risk with regard to operational safety at yards, construction sites, etc. Such collisions are often caused by a blind spot that restricts the visibility of a driver and/or an incorrect assessment of the danger of a blind spot by a person around the vehicle.

U.S. Pat. No. 7,852,462, for example, describes a blind spot detection system. A problem with such known blind spot detection systems is a limitation in the number of configuration options, insufficient accuracy or precision, limited scalability, great complexity and a large installation cost. Moreover, such systems are extremely unsuitable for use on yards, construction sites, etc.

CN 107 415 823 describes a method for detecting a person at the front and rear of a vehicle by means of a UWB item. If a predetermined distance is less than a limit value, an alarm is triggered. However, it does not describe a blind spot detection system. In addition, the CN '823 collision detection system only works when the vehicle is in motion.

Stefan Galler in 'Combined AOA/TOA UWB localization' and Rohrig in 'Tracking of transport vehicles for warehouse management using a wireless sensor network' describe an indoor positioning system using a hybrid AOA/TOA technique. However, both are not related to blind spot detection, and moreover cannot simply be extended to outdoor applications without having to substantially and inventively change the methodologies from the publications mentioned.

Rohrig et al describe in 'Tracking of transport vehicles for warehouse management using a wireless sensor network' combining TDOA and AOA for accurate positioning, but does so in a different context, and does not discuss blind spots.

Methods, systems and computer program products are needed suitable for blind spot detection on a vehicle, in particular a construction vehicle and/or a carrier vehicle.

The present invention has as an object an improved detection method that excludes at least one of the aforementioned technical disadvantages of known devices.

SUMMARY OF THE INVENTION

In a first aspect, the invention relates to a method for determining a position of a person with respect to a blind spot of a vehicle according to claim 1.

In a second and third aspect, the invention relates to a system and a computer program product, respectively, for determining a position of a person with respect to a blind spot of a vehicle according to claims 14 and 15.

The present invention is advantageous due to accurate positioning, even outside and at a distance from a cluster of UWB anchors, excellent scalability and low installation cost.

Further advantages, embodiments and preferred embodiments of the invention are discussed below in the description, the examples and the figures.

DETAILED DESCRIPTION OF THE INVENTION

Figure 1:
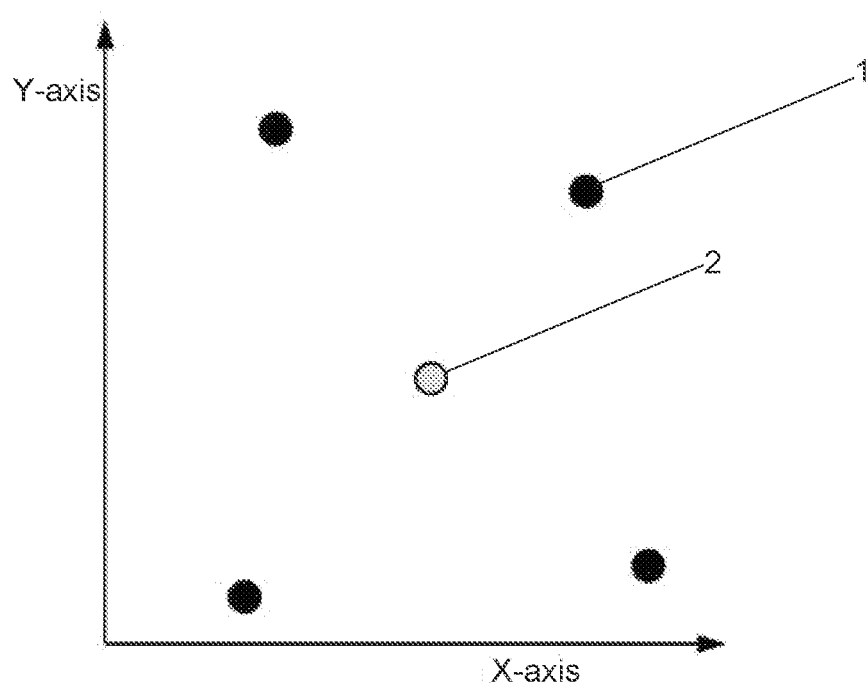
FIG. 1 illustrates an arrangement known in the art, suitable for use in an indoor environment.

The invention relates to a method, system and computer program product for determining a position of a person with respect to a blind spot of a vehicle. The invention was summarised in the section provided for this purpose. In the following, the invention is described in detail, and various embodiments and preferred embodiments are explained.

Unless otherwise defined, all terms used in the description of the invention, including technical and scientific terms, have the meaning as commonly understood by a person skilled in the art to which the invention pertains.

For a better understanding of the description of the invention, the following terms are explained explicitly.

In this document, 'a' and 'the' refer to both the singular and the plural, unless the context presupposes otherwise. For example, 'a segment' means one or more segments.

The terms 'comprise', 'comprising', 'consist of', 'consisting of', 'provided with', 'have', 'having', 'include', 'including', 'contain', 'containing' are synonyms and are inclusive or open terms that indicate the presence of what follows, and which do not exclude or prevent the presence of other components, characteristics, elements, members, steps, as known from or disclosed in the prior art.

'Ultra-wideband' (UWB), as used herein, refers to a term known in the art that designates signals that occupy a substantial bandwidth with respect to a centre frequency. According to the Federal Communications Commission (FCC), a UWB signal is a signal whose fractional bandwidth, that is, the ratio between a bandwidth and the centre frequency of the signal, is equal to or greater than 0.2, or whose bandwidth is equal to or greater than 500 MHz. Such bandwidth corresponds in the time domain to very short pulses. This allows UWB-based radar systems to obtain more accurate target information and allows radars to be designed with improved spatial resolution compared to conventional radar systems.

Quoting numerical intervals by endpoints comprises all integers, fractions and/or real numbers between the endpoints, these endpoints included.

In a first aspect, the invention relates to a method for determining a position of a person with respect to a blind spot of a vehicle. The method comprises the steps of providing a UWB item associated with the person; providing two or more UWB anchors on the vehicle; and determining a geofence along a perimeter of the blind spot of the vehicle. The method preferably comprises the step of selecting a reference anchor from the two or more UWB anchors. The method preferably further comprises the step of determining a distance between the UWB item and the reference anchor based on a Two-Way Ranging (TWR) technique. The method preferably further comprises the step of determining a direction between the UWB item and two or more of the UWB anchors based on a Time Difference of Arrival (TDoA) technique. The method preferably further comprises the step of determining a position of the UWB item with respect to the two or more UWB anchors based on the determined distance and the determined direction. The method preferably further comprises the step of determining whether the UWB item is in the vehicle's blind spot by comparing the determined position of the UWB item with the determined geofence.

In a second aspect, the invention relates to a system for determining a position of a person with respect to a blind spot of a vehicle. The system comprises a UWB item for the person and one or more UWB anchors for positioning on the vehicle. The system is configured to define a geofence along a perimeter of the vehicle's blind spot. The system is preferably configured to select a reference anchor from the two or more UWB anchors. The system is preferably further configured to determine a distance between the UWB item, and the reference anchor based on a TWR technique. The system is preferably further configured to determine a direction between the UWB item and two or more of the UWB anchors based on a TDoA technique. The system is preferably further configured to determine a position of the UWB item with respect to the two or more UWB anchors based on the determined distance and the determined direction. The system is preferably further configured to determine whether the UWB item is in the vehicle's blind spot by comparing the determined position of the UWB item to the determined geofence.

In a third aspect, the invention relates to a computer program product for determining a position of a person with respect to a blind spot of a vehicle. The product comprises instructions for determining a geofence along a perimeter of the vehicle's blind spot.

The product preferably comprises instructions for selecting a reference anchor from two or more UWB anchors, preferably two or more UWB anchors being provided on the vehicle. The product preferably comprises instructions for determining a distance between a UWB item and the reference anchor based on a TWR technique, preferably wherein the UWB item is associated with the person. The product preferably comprises instructions for determining a direction between the UWB item and two or more of the UWB anchors based on a TDoA technique. The product preferably further comprises instructions for determining a position of the UWB item with respect to the two or more UWB anchors based on the determined distance and the determined direction. The product preferably further comprises instructions for determining whether the UWB item is in the vehicle's blind spot by comparing the determined position of the UWB item to the determined geofence.

A person having ordinary skill in the art will appreciate that the method according to a first aspect of the invention can be implemented in the computer program product according to a second aspect of the invention, and can be carried out using the system according to a third aspect of the invention. In what follows, the three aspects of the present invention are therefore treated together. Furthermore, each feature described above as well as below, may relate to any of the three aspects, even if the feature is described in conjunction with a specific aspect of present invention.

The object of the invention is to determine a position of a UWB item with respect to a vehicle. To this end, the vehicle is fitted with two or more UWB anchors. The UWB anchors are configured to run a positioning protocol with the UWB item. The UWB item can be a UWB transmitter or a UWB receiver. Depending on the positioning protocol used, the UWB anchors can act as a receiver or as a transmitter and receiver. The positioning protocol is a time-based positioning protocol according to the invention. Time-based protocols estimate the distance between a UWB item and a UWB anchor by measuring the time that a radio frequency signal is in transit between both devices (Time-of-flight, ToF). The ToF between the UWB item and the anchors is determined on the basis of both a Two-Way Ranging (TWR) technique and a Time Difference of Arrival (TDoA) technique. A TWR technique exchanges multiple packets between two or more UWB items. Each packet comprises one or more timestamps. Such time stamps are used to estimate the ToF. In a TWR technique, both the UWB anchor and the UWB item are transmitter and receiver. In a TDoA technique, the UWB anchor is receiver and the UWB item is transmitter. Both techniques generate inaccurate results within the arrangements according to the invention due to a high geometric dilution of precision (GDOP). However, the inventors noted that for a TWR and a TDoA technique, respectively, the distance estimate and the direction estimate remain accurate. The present invention determines the position of the UWB item with respect to the anchors based on the distance determined based on a TWR technique and the direction determined based on a TDoA technique. The inaccurate position fixes of both techniques are thus no longer a disadvantage in the invention, but the technical feature that allows realisation of the invention. This allows for accurate positioning of the person, even if they are a considerable distance away from the vehicle.

In particular, the invention contemplates determining a position of a UWB item with respect to an area around the vehicle. For this purpose, a geofence is determined along a perimeter, i.e. an outer circumference of this area. To determine if the UWB item is in this area, the determined position of the UWB item is compared with the determined geofence. The term 'geofence', as used herein, refers to a term known in the art that denotes a virtual demarcation, perimeter or circumference of a physical location. Geofences come in different shapes, from round to square to a straight line between two different points. They are created using software that allows the user to draw a geofence around a specific area. Geofences are created from a set of longitudes and latitudes, coordinates in a Cartesian coordinate system or from the radius of a circle around one central point. With a geofence it is therefore possible to draw a dividing line between a certain area and the environment around it. In addition, it is possible to monitor movements within the demarcated area. The demarcated area according to the invention is a blind spot of the vehicle. The term 'blind spot', as used herein, refers to a term known in the art that designates a region around a vehicle that is difficult to see to invisible to a driver. Such regions are associated with a high risk of collision. For a vehicle, the blind spots typically occur on both sides of the vehicle, approximately starting at a driver's position and sometimes extending beyond the rear of the vehicle. The location of these blind spots is strongly dependent on the type of vehicle as well as, for example, an angle adjustment of the rear-view mirror. Depending on the angle adjustment of the mirror, different areas may or may not be in a blind spot. Since it is generally not known whether or how the mirror is adjusted for a particular vehicle, a blind spot detector must detect objects along the sides of the vehicle, regardless of the mirror adjustment. Preferably, it is determined whether the UWB item is in the vehicle's blind spot by comparing the determined position of the UWB item and the determined geofence based on a point-in-polygon algorithm. Such algorithms are known in the art and indicate determining whether a particular point in the plane is inside, outside, or on the edge of a polygon. The point within such an algorithm is to be understood as the UWB item. The polygon within such an algorithm is to be understood as an approximation of the vehicle's blind spot. The inventors note that such an algorithm can provide a simple representation of a vehicle's blind spot. As a result, such an algorithm is easily scalable for multiple blind spots of one or more vehicles.

In particular, the invention aims to increase the safety of a person on a yard, construction site and/or any industrial setting. Such environments are characterised by the presence of a large group of people and/or vehicles, as well as uneven terrain and/or obstacles. An important feature of a blind spot detection system for such an environment is a sufficiently accurate position determination. After thorough research by the inventors, they note that a position determination must be accurate to within 50 cm to ensure that a person is actually in a blind spot of a vehicle or not. The inventors also note, after thorough investigation, that such a system should also recognise a person up to a distance of 50 m from the vehicle, in order to ensure that the person can be notified in time in the event of a fast approaching vehicle. After extensively testing a TWR and TDoA fusion technique according to the invention, the inventors note that the TWR and TDoA fusion technique meets these requirements. Another important feature of a blind spot detection system for such an environment is the scalability of the system to multiple blind spots of one or more vehicles. After thorough investigation by the inventors, they note that a position determination of a large number of persons, such as, for example, a hundred, must be possible within a radius of 50 m from the vehicle, in order to ensure that each of these persons can be detected in time. TWR techniques in particular are scalable to a limited degree, as multiple packets, i.e. three packets by default, are required. POLL, RESPONSE and FINAL, between the UWB item and each of the anchors are exchanged. Such limitation is due, among other things, to physical limitations of the anchors and/or the computing power of the system. The present invention provides a solution for this by selecting a reference anchor. The TWR protocol is only executed between the UWB item and this reference anchor. Another important feature of a blind spot detection system for such an environment is a sufficiently low installation cost. A system according to the present invention is simple in implementation, production and installation costs. In view of the above advantages, the present invention is suitable for determining a position of multiple UWB items, i.e. persons, with respect to multiple clusters of UWB anchors, i.e. vehicles. Such an extensive set-up is useful, for example, in a yard, construction site and/or any other industrial setting.

In a preferred embodiment, the position of a plurality of persons relative to a delimited space is determined, where for each person a UWB item associated with the person is provided.

In a preferred embodiment, the position of a person with respect to a plurality of delimited spaces is determined, with two or more UWB anchors positioned on each of the confined spaces.

In a preferred embodiment, the UWB anchors are provided on the outside of the vehicle, or at least positioned such that they can optimally perceive UWB items outside the vehicle. However, this can lead to a situation where a user with a UWB item is in the vehicle, and this creates an interaction with the UWB anchors outside the vehicle that could cause an incorrect position determination given the line of sight (LOS) will be limited between the UWB item in the vehicle and some UWB anchors outside of it. For that reason, the method and associated system is adapted to automatically exclude UWB items on the inside of the vehicle from the determination of whether it is in the blind spot. To make this possible, at least one internal UWB anchor is provided in the vehicle itself, which makes it possible to determine via Two-Way-Ranging whether the UWB item is inside or outside the vehicle. If inside the vehicle, the item is thus excluded from further action.

In a preferred embodiment, the vehicle is a construction vehicle and/or a carrier vehicle. Examples of construction vehicles include a bulldozer, a roller compactor, an excavator, etc. Examples of carrier vehicles include a delivery van, a trailer, a truck, etc. Such vehicles are provided with custom parts, each of which is related to a unique visibility restriction of a driver. The use of a geofence to define a blind spot allows for a large amount of configuration options.

In a preferred embodiment, the method comprises the step of notifying the person and/or a driver of the vehicle if the UWB item is in the vehicle's blind spot. Preferably, where the person and/or the driver of the vehicle is notified by the sounding of an alarm. Preferably, the alarm is sounded through one or more notification media. Such notification media may include auditory notification media such as a loudspeaker. Such notification medium may include visual notification media such as LED lighting. Such notification medium may include motion notification media such as a vibrating element. Preferably, the alarm is sounded via auditory notification media, more preferably by means of a loudspeaker.

The loudspeaker can be associated with the vehicle or can be associated with the person. A loudspeaker associated with the vehicle can be provided on, in or around the vehicle. Preferably, the loudspeaker is provided on, in or around one of the two or more UWB anchors. A speaker associated with the person can be integrated into a wearable device. The wearable device can comprise a chain. The wearable device can comprise a badge. The wearable device may comprise a wrist strap. The wearable device can comprise a personal safety item such as, for example, a pair of spectacles, helmet, jacket, safety shoe, and the like. Most preferably, such a loudspeaker is integrated in an armband.

The TWR protocol according to the present invention is executed only between the UWB item and the reference anchor. The reference anchor can be selected as either 'stateless' or 'stateful'. The term 'state' in this context refers to a condition that can be subject to change. According to one embodiment, the same reference anchor is always selected. Alternatively, the reference anchor can also be randomly selected. However, such embodiments are disadvantageous as they allow a reference anchor with a poor connection to the UWB item to be selected. In particular, always selecting the same anchor is not optimal, since a person can move around a vehicle, for example. Thus, ideally, the reference anchor should be frequently re-determined based on a parameter that indicates a distance between an anchor and a UWB item and/or an obstruction of a line of sight between an anchor and a UWB item.

In a preferred embodiment, the reference anchor is selected based on a signal strength indicator (RSSI) output from the UWB item and received on the two or more UWB anchors. The term Received Signal Strength Indicator (RSSI), as used herein, refers to a term known in the art that indicates a measurement of the power contained in a received radio signal. Such implementation is simple and requires little energy and computing power. The received radio signal may indicate a WIFI signal outputted by the UWB item and detected on the vehicle. Preferably, the received radio signal indicates a received UWB signal. Use of a UWB signal is advantageous since such implementation requires only limited adjustment of the configuration of the UWB item. Preferably, the UWB anchor with the highest RSSI is selected as the reference anchor. The RSSI can be thought of as a proxy for a distance of the UWB item from the anchors. By selecting the anchor with the highest RSSI value, an anchor is selected with a high probability that this anchor is close to the UWB item.

In a preferred embodiment, the method comprises the steps of outputting a blink signal at a blink departure time (Tsb) from two or more of the UWB anchors to the UWB item, preferably with the blink signal being outputted at a fixed and/or variable time interval; and receiving the blink signal on the UWB item at a blink receiving time (Trb). Preferably, wherein the reference anchor is selected based on the Trb of the blink signal registered on two or more of the UWB anchors, preferably wherein the UWB anchor with the first Trb is selected as the reference anchor. Such a methodology does not require additional equipment and/or signal transmission. The ToF of the blink signal gives a good indication of the distance of each of the anchors from the UWB item.

Preferably, the blink signal comprises Tsb information. Preferably, wherein the direction between the UWB item and two or more of the UWB anchors is determined based on the Tsb comprised by the blink signal and the Trb registered on two or more of the UWB anchors. Such a methodology combines the selection of the reference anchor with the determination of the distance. Such a methodology requires less energy and/or computing power, and is therefore easily scalable.

In an alternative embodiment, the method comprises the steps of outputting a first blink signal and a second blink signal at a first blink departure time (Tsb1) and a second blink departure time (Tsb2) from two or more of the UWB anchors to the UWB item, preferably wherein the first and second blink signals are outputted at a fixed and/or variable time interval; and receiving the first and second blink signals on the UWB item at a first blink receiving time (Trb1) and a second blink receiving time (Trb2). Preferably, wherein the direction between the UWB item and two or more of the UWB anchors is determined based on the Tsb1 and/or Tsb2 comprised by the first or second blink signal and the Trb1 and/or Trb2 registered on two or more of the UWB anchors. Preferably, wherein a clock offset of the UWB item is determined based on the Tsb1 and/or Tsb2 comprised by the first or second blink signal and the Trb1 and/or Trb2 registered on two or more of the UWB anchors. Preferably, wherein the distance between the UWB item and two or more of the UWB anchors is determined based on the clock offset and the Tsb1 and Tsb2 comprised by the first or second blink signal.

In a preferred embodiment, the method comprises the steps of: outputting a poll signal at a poll departure time (Tsp) of the UWB item to the two or more UWB anchors; receiving the poll signal on the two or more UWB anchors at a poll receiving time (Trp); outputting a response signal at a response departure time (Tsr) from the reference anchor to the UWB item; receiving the response signal on the UWB item at a response receiving time (Trr); outputting a final signal at a final departure time (Tsf) from the UWB item to the reference anchor; and receiving the final signal on the reference anchor at a final receiving time (Trf); wherein the final signal comprises Tsp, Trr and Tsf information and wherein the distance between the UWB item and the reference anchor is determined based on the information comprised by the final signal. Such a TWR technique is efficient. Such a TWR technique is easy to implement.

Preferably, the final signal is outputted at a Tsf to the two or more UWB anchors. More preferably, the final signal is received on the two or more UWB anchors at a final receiving time (Trf). Preferably, the direction between the UWB item and two or more of the UWB anchors is determined based on the Tsp comprised by the final signal and/or comprised by the poll signal and the Trp registered on each of the two or more of the UWB anchors and/or based on the Tsf comprised by the final signal and the Trf registered on each of the two or more of the UWB anchors. By integrating the TWR technique and the TDoA technique in one and the same protocol, efficiency increases. Such a protocol requires less energy and/or computing power, and is therefore easily scalable.

Preferably, the reference anchor is selected based on the Trp of the poll signal registered on each of the two or more UWB anchors. Preferably, the UWB anchor with the first Trp is selected as reference anchor. Alternatively, the poll signal comprises the Tsp and the UWB anchor with the smallest difference between the Trp and the Tsp is selected as the reference anchor. Such a methodology does not require additional equipment and/or signal transmission. The ToF of the poll signal gives a good indication of the distance of each of the anchors from the UWB item.

In a preferred embodiment, the reference anchor is selected based on historical position information of the UWB item with respect to the two or more UWB anchors. Such implementation is simple and requires very little energy and computing power. Preferably, the UWB anchor with a smallest historical distance from the UWB item is selected as the reference anchor. Alternatively, an anchor can be selected based on another type of data, such as historical RSSI information, historical ToF information, etc.

In one embodiment, the reference anchor is selected based on multiple selection criteria. Such selection criteria may comprise one or more from the group: ToF information, location information, RSSI information, etc. Furthermore, such selection criteria may comprise a historical variant of one or more of the aforementioned information, such as, for example: historical ToF information, historical location information, historical RSSI information, etc. A weighting factor can be assigned to the multiple selection criteria used in the selection of the reference anchor.

The anchors are preferably provided on the vehicle in a cluster or polygon configuration. In the case of two anchors, the configuration should be understood as a line. In the case of more than two anchors, the configuration can take the form of any polygon. 2, 3, 4, 5, 6, 7, 8, 9, 10, 11, 12, 13, 14, 15, 16, 17, 18, 19, 20, or more anchors can be provided on the vehicle. In a preferred embodiment, 3, 4 or 5 anchors are provided on the vehicle. The number of anchors provided on the vehicle may depend on the type of vehicle. Preferably, at least one of the two or more UWB anchors is provided on a central portion of an upper side of the vehicle. Such positioning of an anchor is minimally hindered by the vehicle.

Preferably, the vehicle is a carrier vehicle or construction vehicle. Such vehicles are characterized by a reflective metallic wall. Furthermore, such vehicles are also characterised by a substantially cubic or beam shape. Preferably, a UWB anchor is provided substantially on each of the ribs of the cubic or beam-shaped vehicle. More preferably, at least one anchor is provided on a central portion of an upper side of the cubic or beam-shaped vehicle. Providing a greater number of anchors increases the accuracy of the system. However, the required energy consumption and the required computing power also increase. Most preferably, five anchors are provided on the vehicle as described above. Such a configuration is suitable for signal transmission in all directions and is therefore suitable for use on a yard, construction site and/or any industrial setting.

In a preferred embodiment, the system of the present invention comprises a central processing unit. The central processing unit can be provided at a distance from the vehicle. Preferably, the central processing unit is provided on the vehicle. Preferably, there is an operational communication link between the central processing unit and each of the two or more anchors. There may also be an operational communication link between the central processing unit and the UWB item. Preferably, the central processing unit is configured as a Real-Time Location System (RTLS) for calculating the positions of the UWB item, based on data obtained from the anchors and/or the UWB item. Preferably, the central processing unit is configured to store timestamps from the TWR and TDoA positioning protocols.

For the accurate execution of the positioning protocols, an internal clock of each of the UWB anchors must be synchronised. In a preferred embodiment, each of the two or more anchors comprises a synchronised clock. The synchronisation can be done via a UWB signal exchange. Preferably, wherein the clock of the anchors is synchronised via wiring. However, signal exchange for synchronisation is not suitable due to substantial information loss between the anchors provided on the vehicle.

The synchronisation of internal clocks is typically done on a star network, with a central, dedicated clock and sync master entity, which controls the other units (in this case, the anchors). However, in certain situations it is impossible, or impractical, to work from such a star topology, for example when large systems, such as trucks and large vehicles, are used where the anchors are widely distributed spatially. These are daisy-chained according to the system of the invention, so as to avoid having to connect each anchor to a central point, as in a star topology, which makes for a much more complex and expensive installation process. For this reason, daisy-chaining the anchors is used, namely by defining a first anchor in the network as master, which sends a clock and sync pulse to all anchors directly connected to the first anchor. These receiving anchors then generate an (exact) replica of the original clock and sync pulse via a phase-locked loop with an oscillator with limited, low phase noise. Each receiving anchor then sends the generated signal to the next anchors in the chain. By generating the signal over and over again, the signal-to-noise ratio is reset each time, as each anchor can generate a very clear 'start signal' from its internal clock. If the signal is simply forwarded between the different anchors, without regeneration, the signal will degrade to a very poor signal-to-noise ratio after only a few intermediate stations.

The disadvantage of using such a daisy chain is that the physical distance that the signal has to bridge is much greater than with the parallel connections in a star topology due to the serial nature of the daisy chain. This distance will cause synchronisation offsets, as the internal clock of the first anchor is initialised earlier than the last in the daisy chain. In certain embodiments, an RTLS (see above) is provided which is capable of automatically correcting the TOA obtained from the anchors based on these offsets, so as to determine an exact TOA for each of the anchors. Alternatively, this can also be corrected on the basis of a previous calibration, in order to determine the offsets, and then automatically apply the known offsets to the obtained TOAs. This calibration is preferably repeated regularly, and performed with different anchors as the starting point for the synchronisation.

In a preferred embodiment, a filtering technique is applied to the determined distance and/or direction. Preferably, wherein the filter technique is one selected from the following group: a Kalman filter, a high-pass filter or a low-pass filter. Such filtering techniques increase resolution or quality of the determined distances and/or directions. Consequently, an improved position determination of the UWB item is possible.

In a preferred embodiment, a filtering technique is applied to the determined position of the UWB item. Preferably, wherein the filtering technique is one selected from the following group: a Kalman filter or a particle filter. Such filtering techniques increase resolution or quality of the determined position of the UWB item. Consequently, an improved position determination of the UWB item is possible.

In what follows, the invention is described by way of non-limiting examples illustrating the invention, and which are not intended to and should not be interpreted as limiting the scope of the invention.

EXAMPLES

Example 1

Example 1 relates to a method for determining a position of a UWB item with a TWR and TDoA fusion technique outside an arrangement of two or more UWB anchors.

In the following, arrangements known in the art are explained, as well as the drawbacks associated therewith. Furthermore, the invention and its associated advantages are discussed.

FIG. 1 illustrates an arrangement known in the art, suitable for use in an indoor environment. The arrangement comprises four UWB anchors (1) in a polygon configuration. The location of a UWB item (2) can be accurately tracked within the polygon defined by the four anchors, i.e. the direction and/or distance of the UWB item from each of the anchors is sufficiently accurate for a correct determination of the position of the UWB item.

Figure 2:
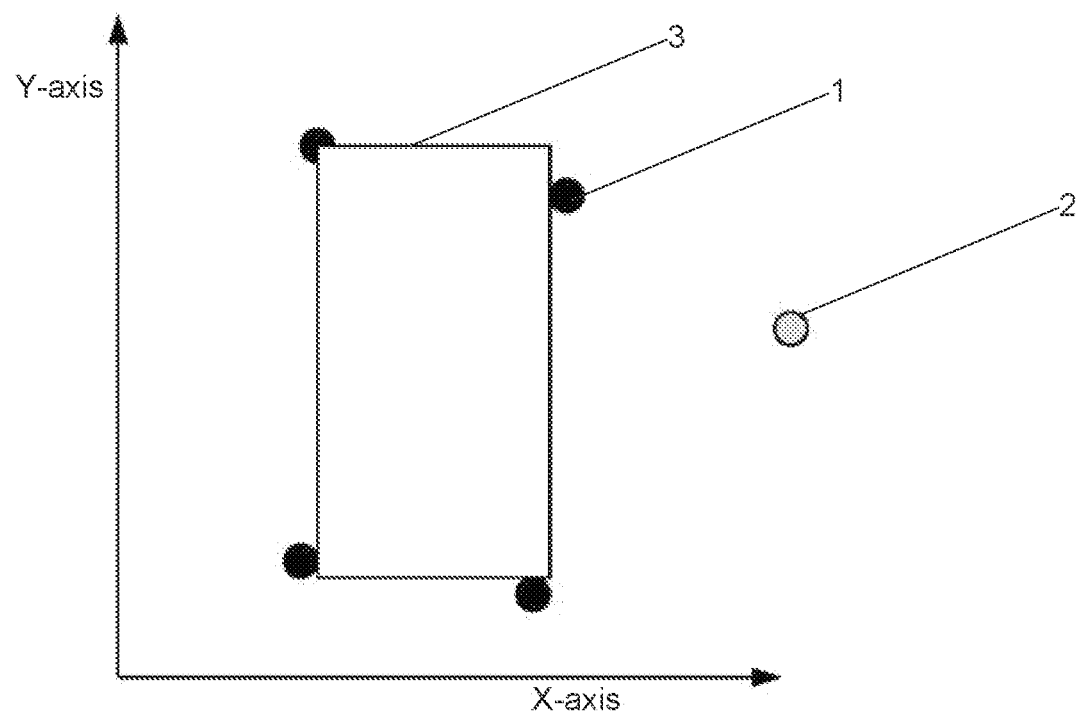
FIG. 2 shows an arrangement according to the present invention, comprising four UWB anchors in a cluster or polygon configuration.

FIG. 2 shows an arrangement according to the present invention. The arrangement comprises four UWB anchors (1) in a cluster or polygon configuration. The anchors (1) can be provided on a vehicle (3) according to the present invention. The location of the UWB item (2) must be determined outside the polygon defined by the four anchors. In addition, the vehicle (3) will block and/or reflect the outputted UWB signals. Known techniques can generate inaccurate results within such arrangements, among other things due to a high geometric dilution of precision (GDOP). For example, a high GDOP is due to a poor distance and/or direction estimate of the UWB item (2) relative to the cluster of UWB anchors (1). The GDOP within such an arrangement also increases further as the UWB item (2) moves away from the anchors (1).

Figure 3:
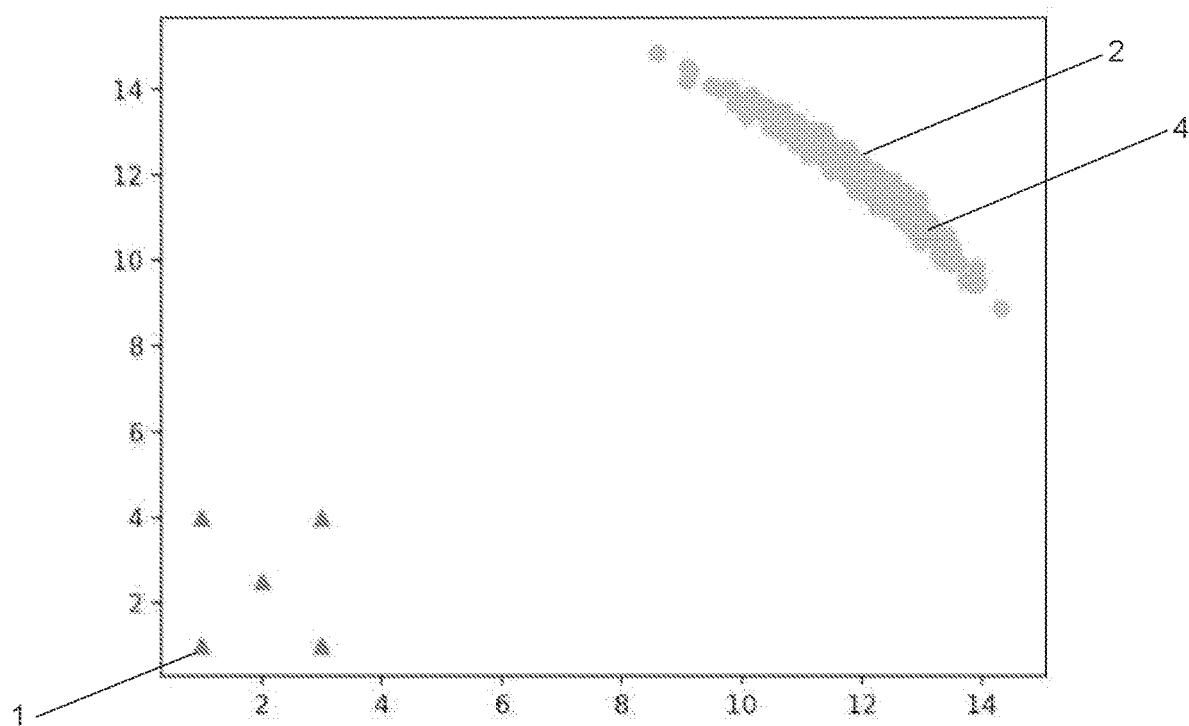
FIGS. 3 to 5 illustrate the accurate position fixes in an arrangement according to the present invention, as well as shortcomings of known techniques.
Figure 4:
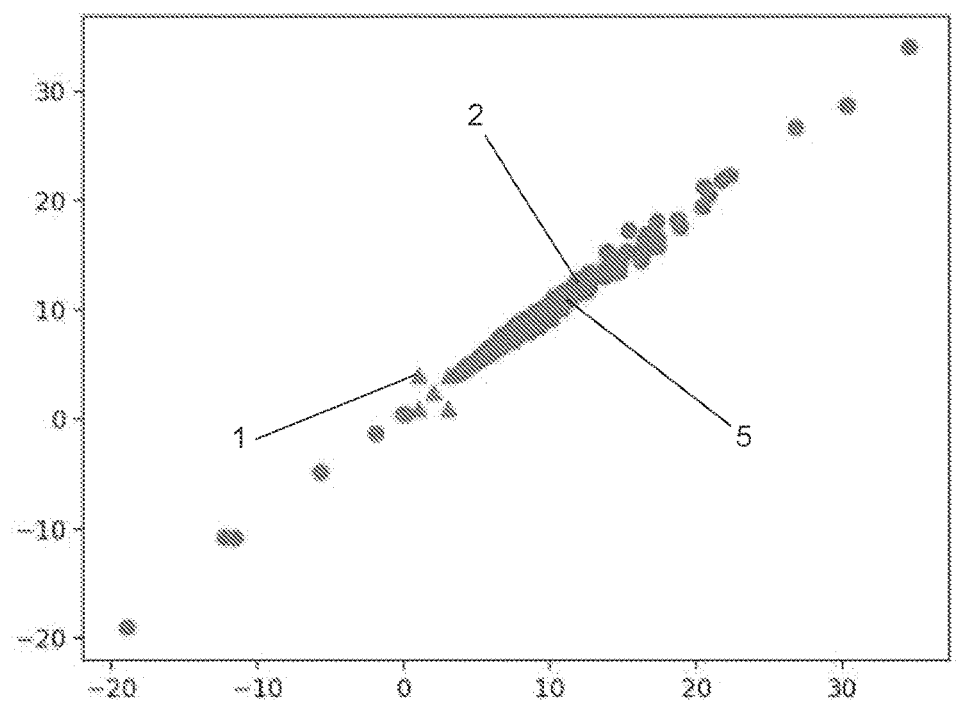

FIGS. 3 and 4 show an arrangement where a UWB item (2) is tracked outside a cluster or polygon configuration of five UWB anchors (1). The anchors (1) are indicated as triangles in the bottom left of the figures. The UWB item (2) is located in both figures at coordinates [12,12]. FIGS. 3 and 4 illustrate drawbacks associated with TWR and TDoA techniques, respectively, when used in an arrangement according to the present invention. The position fixes (4, 5) according to the technique used are indicated as circles in both figures.

FIG. 3 shows simulated GDOP results for a standard TWR technique. The position fixes (4) are obtained by a gradual addition of errors to the distance measurements of the exchanged signals of the TWR technique. The errors illustrate a high GDOP and/or reflection of a vehicle to which the anchors are attached. As the added errors increase, the area of the position fixes (4) increases. The position fixes (4) thus become less accurate and reliable. However, the inventors noted that despite the increasing errors, the position fixes (4) extend around a circumference with the anchors in the centre. Thus, the distance estimates between the UWB item and the anchors remains unexpectedly accurate when determined with a TWR technique for an arrangement suitable for use according to the present invention.

FIG. 4 shows simulated GDOP results for a standard TDoA technique. The position fixes (5) are obtained by a gradual addition of delays to the exchanged signals of the TDoA technique as well as time deviations (drift) of the internal clocks of anchors (1). As the added errors become larger, the area of the position fixes (5) increases. The position fixes (5) thus become less accurate and reliable. However, the inventors noted that despite increasing errors, the position fixes (5) extend in a line, with the cluster anchor at one end and the UWB item at one end. Thus, the direction estimate between the UWB item (2) and the cluster of anchors (1) remains unexpectedly accurate when determined with a TDoA technique for an arrangement suitable for use according to the present invention.

Figure 5:
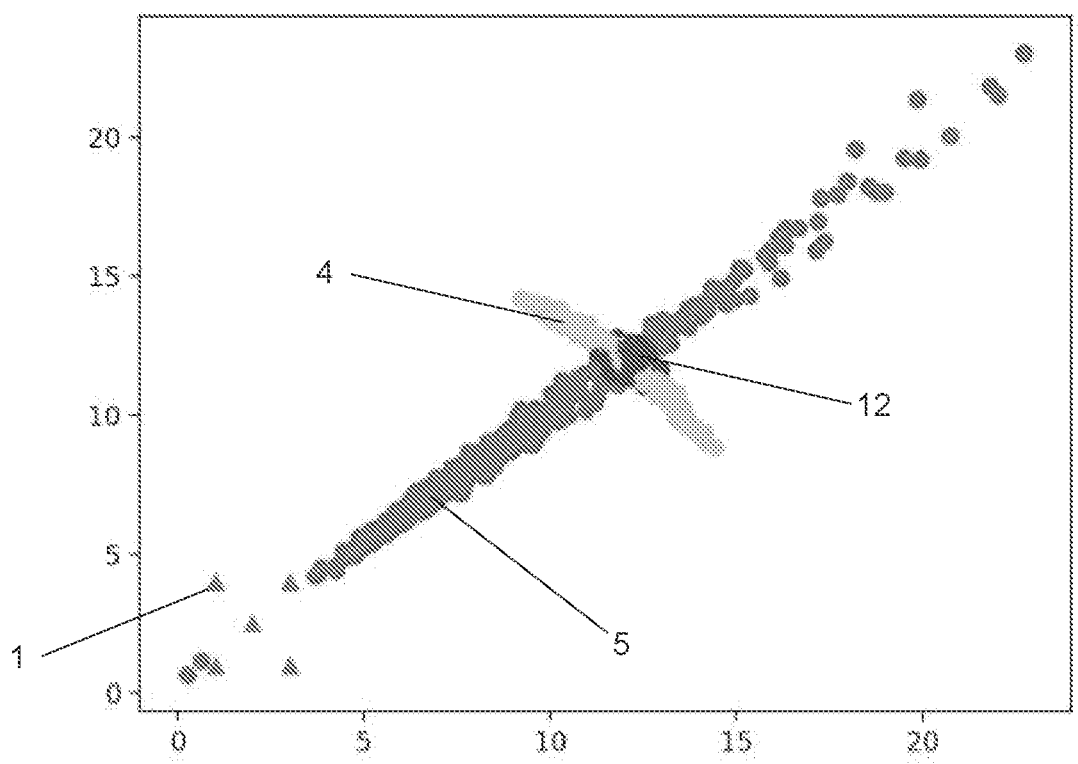

FIG. 5 shows simulated GDOP results for a fusion technique using both TWR and TDoA information. As mentioned above, the inventors unexpectedly noted that the distance estimate between the UWB item (2) and the anchors (1) remains accurate when determined with a standard TWR technique; and that the direction estimate between the UWB item (2) and the anchors (1) remains accurate when determined with a standard TDoA technique, both for an arrangement suitable for use according to the present invention.

The present invention combines a distance determined by a TWR technique with a direction determined by a TDoA technique. As a result, the advantages of both aforementioned techniques are combined, and an accurate position determination (8) of the UWB item is possible, even when the UWB signals used and/or the arrangement is subject to errors due to reflections, time deviations, etc.

Figure 6:
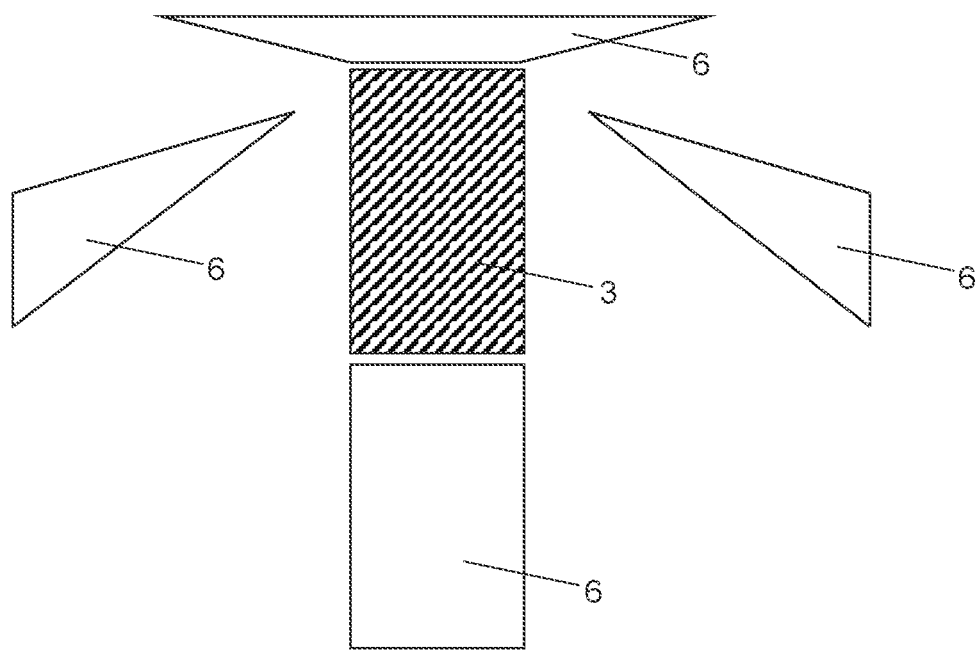
FIG. 6 illustrates a schematic top view of possible blind spots on a vehicle, in particular a carrier vehicle.

The present invention focuses in particular on determining a position of a person with respect to a blind spot (6) of a vehicle (3). To do this, a UWB item must be associated with the person. FIG. 6 illustrates a schematic top view of possible blind spots (6) in a vehicle (3). In particular, the vehicle is (3), a carrier vehicle (3) and/or a construction vehicle (3).

Example 2

Example 2 relates to an integrated TWR and TDoA fusion technique according to the present invention.

Figure 7:
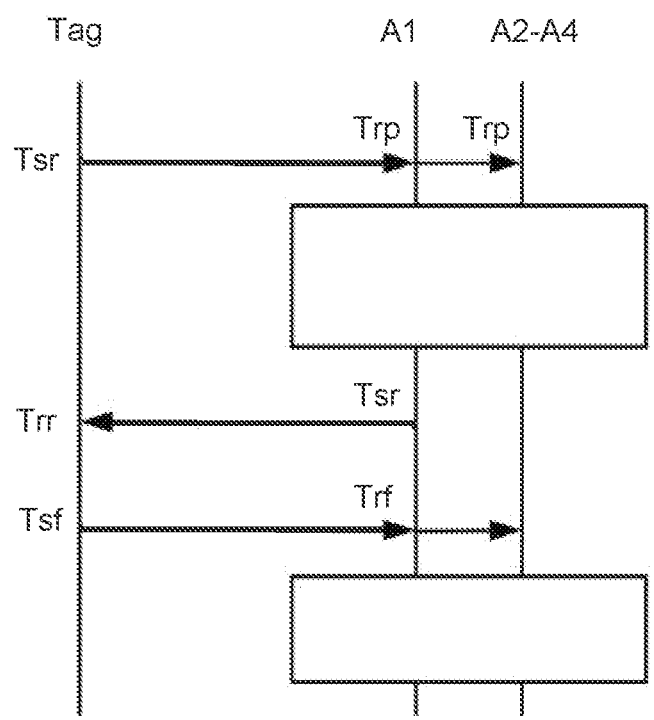
FIG. 7 shows an overview of a TWR and TDoA fusion technique according to the present invention.

FIG. 7 shows an overview of the integrated TWR and TDoA fusion technique according to the present invention. According to this embodiment, both the TWR and TDoA measurements are performed in the same protocol for improved efficiency.

The arrangement according to FIG. 7 comprises four anchors (A1-A4). Such an arrangement in which the anchors are provided on a vehicle is shown, for example, in FIG. 2. A standard TWR protocol comprises the exchange of three signals for determining the ToF between the UWB item and the anchors. These signals are referred to as POLL, RESPONSE and FINAL, respectively.

The TWR protocol is initiated by outputting a poll signal at a poll departure time (Tsp) from the UWB item (Tag, T) to the two or more UWB anchors (A1-A4). The poll signal is received on the two or more UWB anchors (A1-A4) at a poll receiving time (Trp). Normally each of the two or more UWB anchors (A1-A4) receives this signal. However, it is possible that an anchor (A1-A4) does not receive this signal due to, for example, a shielding or reflection of the signal. The anchor (A1-A4) with the first Trp is selected as the reference anchor (A1).

In response to the received poll signal, a response signal at a response departure time (Tsr) is outputted from the reference anchor (A1) to the UWB item (T). The response signal is received on the UWB item (T) at a response receiving time (Trr). In response to the received response signal, a final signal is sent at a final departure time (Tsf) from the UWB item (T) to the reference anchor (A1) and the remaining anchors (A2-A3). The final signal is received at a final receiving time (Trf) on the reference anchor (A1) as well as on the anchors (A2-A3).

Based on the Tsp comprised by the final signal or poll signal and the Trp registered on each of the two or more of the UWB anchors (A1-A4), the TDoA protocol is executed, and the direction is determined between the UWB item (T) and two or more of the UWB anchors (A1-A4). Alternatively, the direction between the UWB item (T) and two or more of the UWB anchors (A1-A4) can also be determined based on the Tsf comprised by the final signal and the Trf registered on each of the two or more of the UWB anchors (A1-A4).

The final signal comprises Tsp, Trr and Tsf information. Based on this information, the TWR protocol is carried out and the distance is determined between the UWB item (T) and the reference anchor (A1).

The invention claimed is:

1. Method for determining a position of a person with respect to a blind spot of a vehicle, comprising the steps of:
    providing an ultra-wideband (UWB) item associated with the person;
    providing two or more UWB anchors on the vehicle; and
    determining a geofence along a perimeter of the blind spot of the vehicle;
    selecting a reference anchor from the two or more UWB anchors;
    determining a distance between the UWB item and the reference anchor based on a Two-Way Ranging (TWR) technique;

determining a direction between the UWB item and two or more of the UWB anchors based on a Time Difference of Arrival (TDoA) technique;

determining a position of the UWB item with respect to the two or more UWB anchors based on the determined distance and the determined direction; and determining whether the UWB item is in the blind spot of the vehicle by comparing the determined position of the UWB item to the determined geofence.

2. The method according to claim 1, wherein said reference anchor is selected based on a signal strength indicator (RSSI) outputted from the UWB item and received on the two or more UWB anchors, preferably wherein the UWB anchor with the highest RSSI is selected as the reference anchor.

3. The method according to claim 1, wherein said reference anchor is selected based on historical position information of the UWB item with respect to the two or more UWB anchors, preferably wherein the UWB anchor with a smallest historical distance from the UWB item is selected as the reference anchor.

4. The method according to claim 1, the method comprising the steps of:

outputting a blink signal at a blink departure time (Tsb) from two or more of the UWB anchors to the UWB item, preferably wherein the blink signal is outputted at a fixed and/or variable time interval; and receiving the blink signal on the UWB item at a blink receiving time (Trb); wherein said reference anchor is selected based on the Trb of the blink signal registered on two or more of the UWB anchors, preferably wherein the UWB anchor with the first Trb is selected as the reference anchor.

5. The method according to preceding claim 4, wherein the blink signal comprises Tsb information and wherein the direction between the UWB item and two or more of the UWB anchors is determined based on the Tsb comprised by the blink signal and the Trb registered on two or more of the UWB anchors.

6. The method according to claim 1, the method comprising the steps of:

outputting a poll signal at a poll departure time (Tsp) of the UWB item to the two or more UWB anchors;

receiving the poll signal on the two or more UWB anchors at a poll receiving time (Trp);

outputting a response signal at a response departure time (Tsr) from the reference anchor to the UWB item;

receiving the response signal on the UWB item at a response receiving time (Trr);

outputting a final signal at a final departure time (Tsf) from the UWB item to the reference anchor; and receiving the final signal on the reference anchor at a final receiving time (Trf);

wherein the final signal comprises Tsp, Trr and Tsf information and wherein the distance between the UWB item and the reference anchor is determined based on the information comprised by the final signal.

7. The method according to claim 6, wherein the final signal is outputted at a Tsf to the two or more UWB anchors, wherein the final signal is received on the two or more UWB anchors at a final receiving time (Trf), wherein the direction between the UWB item and two or more of the UWB anchors is determined based on the Tsp comprised by the final signal and/or comprised by the poll signal and the Trp registered on each of the two or more of the UWB anchors and/or based on the Tsf comprised by the final signal and the Trf registered on each of the two or more of the UWB anchors.

8. The method according to claim 6, wherein said reference anchor is selected based on the Trp of the poll signal registered on each of the two or more UWB anchors, wherein the UWB anchor with the first Trp is selected as the reference anchor.

9. The method according to claim 1, the method comprising the step of notifying the person and/or a driver of the vehicle if the UWB item is in the blind spot of the vehicle, wherein the person and/or the driver of the vehicle is notified by a sounding of an alarm.

10. The method according to claim 1, wherein a filter technique is applied to the determined distance and/or direction and wherein the filter technique is one or more selected from the group: a Kalman filter, a high-pass filter or a low-pass filter.

11. The method according to claim 1, wherein a filtering technique is applied to the determined position of the UWB item and wherein the filtering technique is one or more selected from the group: a Kalman filter or a particle filter.

12. The method according to claim 1, wherein each of the two or more anchors comprise a synchronised clock and the clock of the anchors is synchronised via wiring.

13. The method according to claim 1, wherein it is determined whether the UWB item is in the blind spot of the vehicle, by comparing the determined position of the UWB item and the determined geofence based on a point-in-polygon algorithm-.

14. The method according to claim 1, wherein one or more internal UWB anchors are provided on the inside of the vehicle, wherein, using a Two-Way-Ranging technique with respect to one or more of the internal UWB anchors, it is determined whether the UWB item is within the vehicle, and wherein a UWB item located in the vehicle is automatically excluded from the step of determining if the UWB item is in the blind spot of the vehicle.

15. System for determining a person's position with respect to a blind spot of a vehicle, comprising a UWB item for the person and one or more UWB anchors for positioning on the vehicle, wherein the system is configured for determining a geofence along a perimeter of the blind spot of the vehicle, wherein the system is configured for:

selecting a reference anchor from the two or more UWB anchors;

determining a distance between the UWB item and the reference anchor based on a Two-Way Ranging (TWR) technique;

determining a direction between the UWB item and two or more of the UWB anchors based on a Time Difference of Arrival (TDoA) technique;

determining a position of the UWB item with respect to the two or more UWB anchors based on the determined distance and the determined direction; and determining whether the UWB item is in the blind spot of the vehicle by comparing the determined position of the UWB item to the determined geofence.

16. A non-transitory computer-readable medium storing computer-executable instructions for determining a person's position with respect to a blind spot of a vehicle and determining a geofence along a perimeter of the blind spot of the vehicle, which, when executed by a processor, cause the processor to:

select a reference anchor from two or more UWB anchors, preferably wherein two or more UWB anchors are provided on the vehicle;

determine a distance between a UWB item and the reference anchor based on a Two-Way-Ranging (TWR) technique, preferably wherein the UWB item is associated with the person;

determine a direction between the UWB item and two or more of the UWB anchors based on a Time Difference of Arrival (TDoA) technique; determining a position of the UWB item with respect to the two or more UWB anchors based on the determined distance and the determined direction; and determine whether the UWB item is in the blind spot of the vehicle by comparing the determined position of the UWB item to the determined geofence.

* * * * *